US012595889B2

(12) United States Patent
Jin

(10) Patent No.: US 12,595,889 B2

(45) Date of Patent: Apr. 7, 2026

(54) LAMP FOR VEHICLE

(71) Applicant: HYUNDAI MOBIS CO., LTD., Seoul (KR)

(72) Inventor: Min Ji Jin, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 19/035,017

(22) Filed: Jan. 23, 2025

(65) Prior Publication Data

US 2026/0063266 A1 Mar. 5, 2026

(30) Foreign Application Priority Data

Sep. 4, 2024 (KR) ........................ 10-2024-0119654

(51) Int. Cl.

| | |
|---|---|
| ***F21S 41/32*** | (2018.01) |
| ***F21S 41/143*** | (2018.01) |
| ***F21S 41/151*** | (2018.01) |
| ***F21S 41/25*** | (2018.01) |
| ***F21S 43/10*** | (2018.01) |
| ***F21S 43/20*** | (2018.01) |

(52) U.S. Cl.

CPC ........... *F21S 41/322* (2018.01); *F21S 41/143* (2018.01); *F21S 41/151* (2018.01); *F21S 41/25* (2018.01); *F21S 43/10* (2018.01); *F21S 43/26211* (2024.05)

(58) Field of Classification Search

CPC ........ F21S 41/322; F21S 41/25; F21S 41/143; F21S 41/151; F21S 41/147; F21S 43/26411

See application file for complete search history.

(56) References Cited

U.S. PATENT DOCUMENTS

| | | | | |
|---|---|---|---|---|
| 10,082,272 | B2 * | 9/2018 | Gromfeld | F21S 41/265 |
| 10,203,081 | B2 * | 2/2019 | Matsuda | F21S 41/143 |
| 10,690,309 | B2 * | 6/2020 | Gromfeld | F21S 41/265 |
| 10,724,700 | B2 * | 7/2020 | De Lamberterie | F21S 41/27 |
| 11,506,358 | B2 * | 11/2022 | Chen | F21S 41/365 |
| 2015/0131305 | A1 * | 5/2015 | Courcier | F21S 41/322 362/516 |
| 2025/0237365 | A1 * | 7/2025 | Park | F21S 41/285 |

* cited by examiner

*Primary Examiner* — Matthew J. Peerce

(74) *Attorney, Agent, or Firm* — Novo TechIP International PLLC

(57) ABSTRACT

Disclosed is a lamp for a vehicle including a first light source unit including a plurality of first light source parts, and disposed on one side in a leftward/rightward direction, a second light source unit including a plurality of second light source parts, and disposed on an opposite side to the first light source unit, a first total reflection lens in which a plurality of first lens structures are integrally formed, and disposed on one side with respect to the leftward/rightward direction, a second total reflection lens, in which a plurality of second lens structures are integrally formed, and disposed on an opposite side to the first light source unit, and an output lens disposed on a front side of the first total reflection lens and the second total reflection lens.

19 Claims, 21 Drawing Sheets

LAMP FOR VEHICLE

CROSS-REFERENCE TO RELATED APPLICATIONS

This application claims the benefit of priority to Korean Patent Application No. 10-2024-0119654, filed in the Korean Intellectual Property Office on Sep. 4, 2024, the entire contents of which are incorporated herein by reference.

TECHNICAL FIELD

The present disclosure relates to a lamp for a vehicle.

BACKGROUND

Generally, vehicles are provided with various types of lamps that have lighting functions for easily identifying objects that are located around the vehicles during driving at night and signaling functions for informing other vehicles or road users of the driving state of the vehicles.

For example, headlamps (headlights) and fog lamps that are mainly for lighting functions, and turn signal lamps, tail lamps, brake lamps, side markers, and the like that are for signaling functions are provided, and the installation standards and specifications of these lamps for a vehicle are ruled by the laws so that the functions may be fully utilized.

Among the lamps for a vehicle, headlamps that form low beam patterns or high beam patterns to secure the forward view of the driver during driving at night play a very important role in safe driving.

Meanwhile, recently, a performance of headlamps is important, but an external design of the headlamps and light distribution patterns is also becoming equally important.

However, because the light distribution patterns have to be formed by applying an aspherical lens with a single focus, it is difficult to implement diverse designs of headlamps and light distribution patterns, which limit the design, and it is difficult to satisfy the rapidly changing needs of consumers.

In addition, because different optical systems have to be used to form long-distance light distribution patterns and short-distance light distribution patterns, the structures and manufacturing processes are complicated and the manufacturing costs increase.

Accordingly, recently, various studies have been conducted to simplify the structures and the manufacturing processes and improve the design characteristics of the lamps and the light distribution patterns, but they are still insufficient, and thus, development for them is required.

SUMMARY

The present disclosure has been made to solve the above-mentioned problems occurring in the prior art while advantages achieved by the prior art are maintained intact.

An aspect of the present disclosure provides a vehicle lamp that simplifies an assembly process through simplification of components and minimizes an assembly tolerance to improve an optical efficiency.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes a first light source unit including a plurality of first light source parts, and disposed on one side in a leftward/rightward direction, a second light source unit including a plurality of second light source parts, and disposed on an opposite side to the first light source unit, a first total reflection lens configured to condense light irradiated from the plurality of first light source parts and output the light forward, in which a plurality of first lens structures are integrally formed, and disposed on one side with respect to the leftward/rightward direction, a second total reflection lens, in which a plurality of second lens structures that to condense light irradiated from the plurality of second light source parts and output the light forward are integrally formed, and disposed on an opposite side to the first light source unit, and an output lens disposed on a front side of the first total reflection lens and the second total reflection lens, each of the first lens structures includes a first cutoff part having a step at a lower end of a first light output surface formed on a front side, each of the second lens structures includes a second cutoff part for med at a lower end of a second light output surface formed on the front side, and the first cutoff part and the second cutoff part are configured to form a cutoff line of a low beam pattern together.

The output lens may include a first output lens part including a first input surface, to which light output from the first total reflection lens is input, and a first output surface, from which the input light is output, and a second output lens part including a second input surface, to which light output from the second total reflection lens is input, and a second output surface, from which the input light is output, and the first input surface and the second input surface may have different shapes.

A first light distribution pattern may be formed by light output from the first output lens part, a second light distribution pattern being different from the first light distribution pattern may be formed by light output from the second output lens part, and the first light distribution pattern and the second light distribution pattern may overlap each other to form a low beam pattern.

The number of the second lens structures may be greater than the number of the first lens structures.

The first lens structure may include a first light input part, to which light is input, and a first body part disposed on a front side of the first light input part, and in which the first light output surface is formed on a front side thereof, the first body part may include a first inclined surface formed on a lower surface thereof to be inclined upward as it goes forward, and the first cutoff part may be formed at a front end of the first inclined surface.

The plurality of first light output surfaces provided in the plurality of first lens structures, respectively, may be integrally formed to define one lens light output surface, and the lens light output surface may be formed to have a shape, in which a leftward/rightward cross-sectional shape of the lens light output surface is curved to be concave in a direction toward the first light source unit.

When among the plurality of first lens structures included in the first total reflection lens, the first lens structure disposed at a center with respect to the leftward/rightward direction is defined as a central lens structure, and the first lens structure disposed on opposite sides of the central lens structure are defined as side lens structures, paths of light, which is formed in the side lens structures, may be defocused on the lens light output surface.

The first total reflection lens may be formed such that a central axis of the first total reflection lens is spaced apart from a focus formed in the first output lens part.

On a cross-section being perpendicular to a central axis of the first lens structure, the first light output surface may be formed to be inclined toward the first light input part as it goes upward.

The second lens structure may include a second light input part, to which light is input, and a second body part disposed on a front side of the second light input part, and in which the second light output surface is formed on a front side thereof, the second body part may include a second inclined surface formed on a lower surface thereof to be inclined upward as it goes forward, and the second cutoff part may be formed at a front end of the second inclined surface.

The second light output surface may be formed to be inclined toward the second light input part as it goes upward.

The plurality of second lens structures may be arranged in the leftward/rightward direction, and when an angle, at which the second light output surface is tilted on a cross-section passing through a central axis of the second lens structure and being perpendicular to a ground surface, is defined as a tilting angle, the tilting angles of the second light output surfaces provided in the plurality of second lens structures may become smaller as they go from ends with respect to the leftward/rightward direction to opposite ends with respect to the leftward/rightward direction.

The first input surface may be formed to be convex in a direction toward the first total reflection lens in the leftward/rightward direction, and the first output surface may be formed to be convex toward a front side in the leftward/rightward direction.

The second input surface may be formed such that a rear side thereof is curved in a direction toward the second total reflection lens as it goes from one end to an opposite end in the leftward/rightward direction, and the second output surface may be formed to be curved in a shape corresponding to the second input surface in the leftward/rightward direction.

The first output surface and the second output surface may be formed continuously.

Light guided by the plurality of second lens structures may form a plurality of vertical focuses in a vertical direction, and the plurality of vertical focuses may be formed to be curved along a direction, in which the second output surface is curved.

Positions of the plurality of second cutoff parts provided in the plurality of second lens structures may be located in positions corresponding to the plurality of vertical focuses.

The second cutoff part may be formed to be located on a front side of a focus formed by the second output lens part.

A path of light formed by at least some of the plurality of second lens structures may be asymmetrical in the leftward/rightward direction with respect to central axes of the second lens structures.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the attached drawings.

First, the embodiments described below are suitable embodiments for understanding the technical features of a lamp for a vehicle of the present disclosure. However, the present disclosure is not limited to the embodiments described below or the technical features of the present disclosure are limited by the embodiments described, and various modifications may be implemented within the technical scope of the present disclosure.

Figure 1:
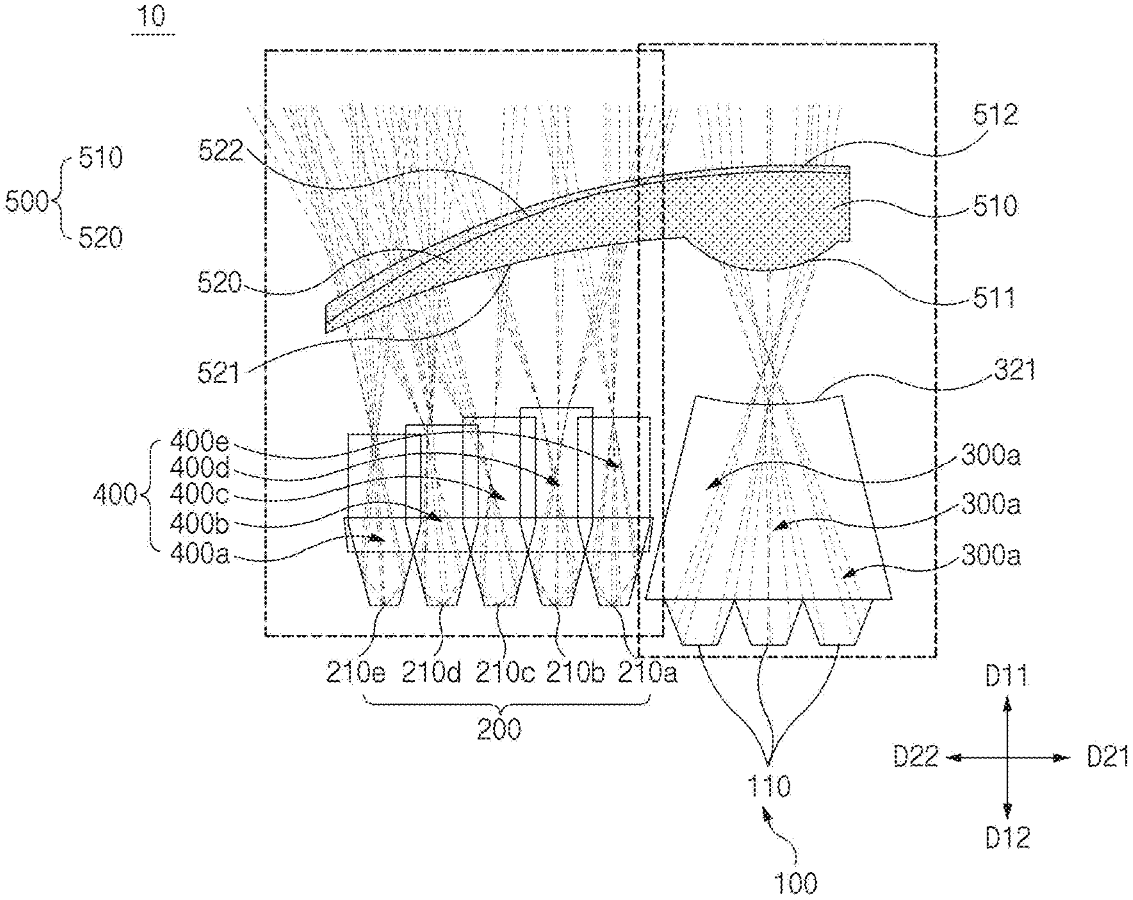
FIG. 1 is a top view illustrating a lamp for a vehicle according to an embodiment of the present disclosure.
Figure 2:
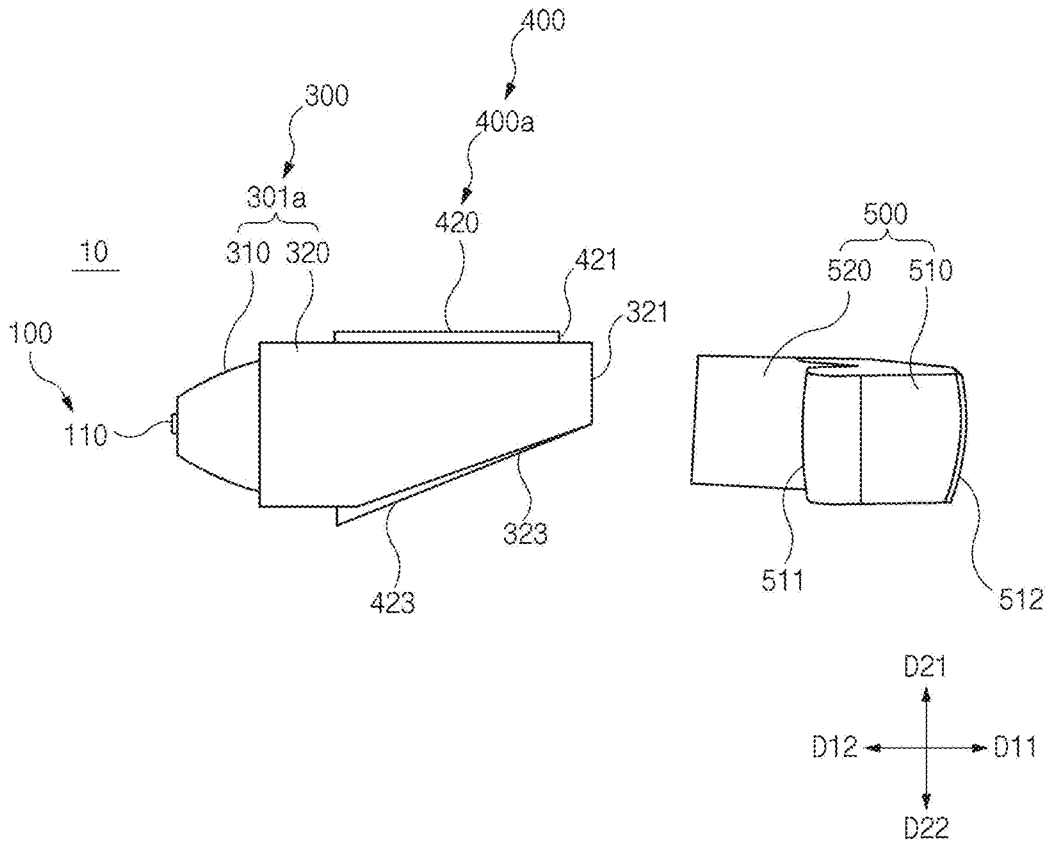
FIG. 2 is a side view illustrating a lamp for a vehicle according to an embodiment of the present disclosure.
Figure 3:
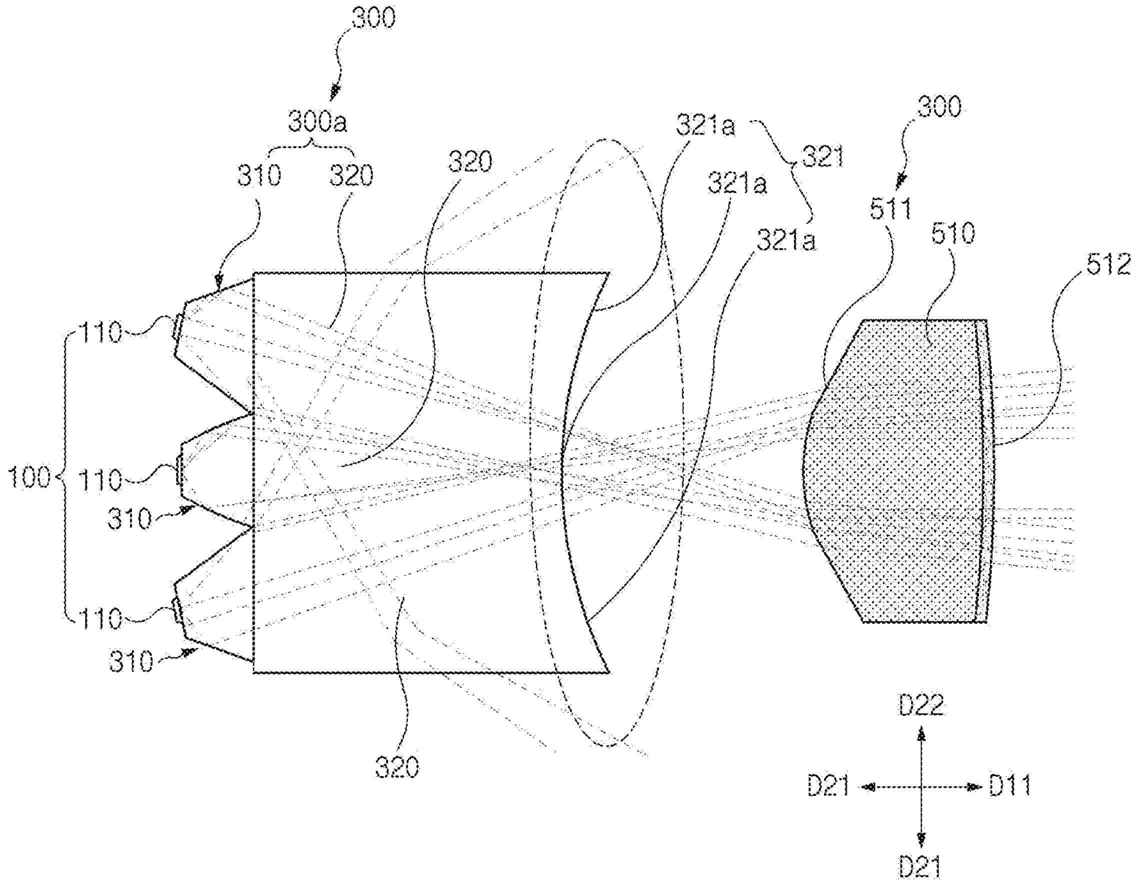
FIG. 3 is a top view illustrating a first total reflection lens and a first output lens part according to an embodiment of the present disclosure.
Figure 4:
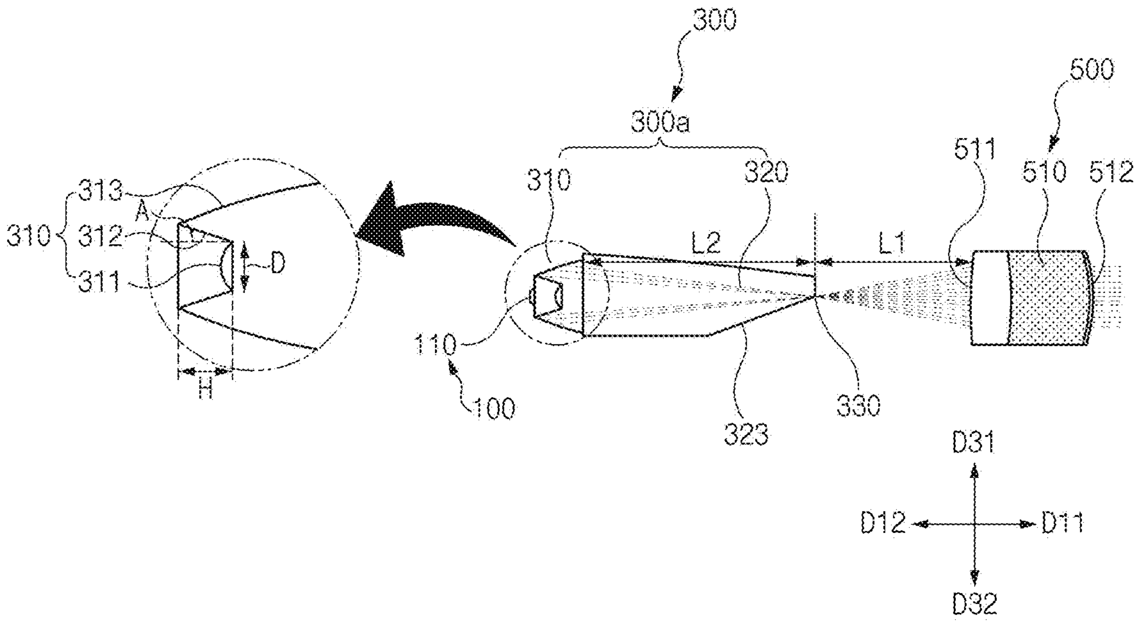
FIG. 4 is a side view illustrating a first total reflection lens and a first output lens part according to an embodiment of the present disclosure.
Figure 5:
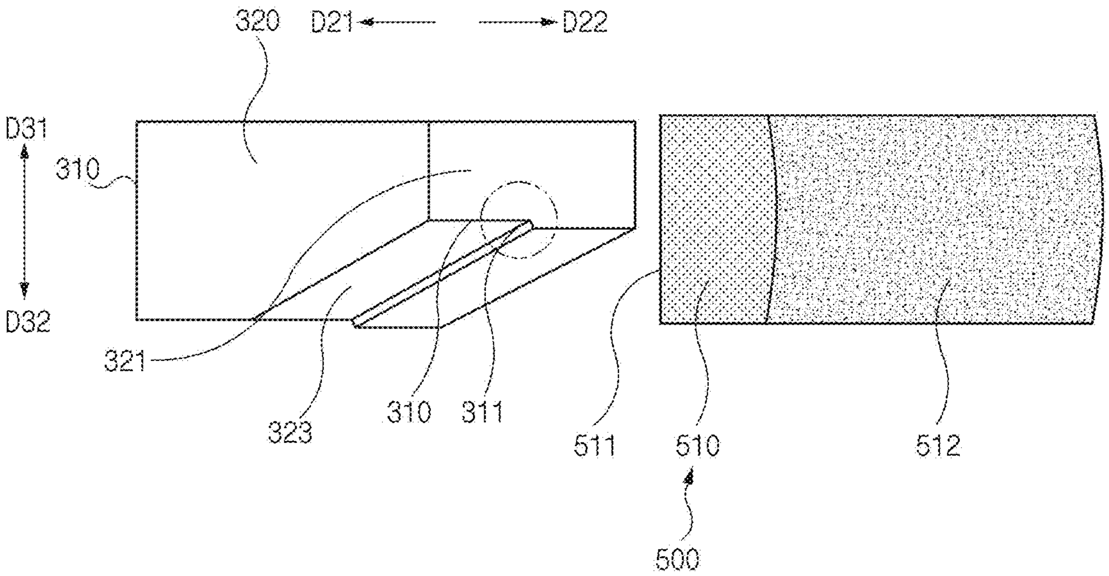
FIG. 5 is a perspective view illustrating a first total reflection lens and a first output lens part according to an embodiment of the present disclosure.
Figure 6:
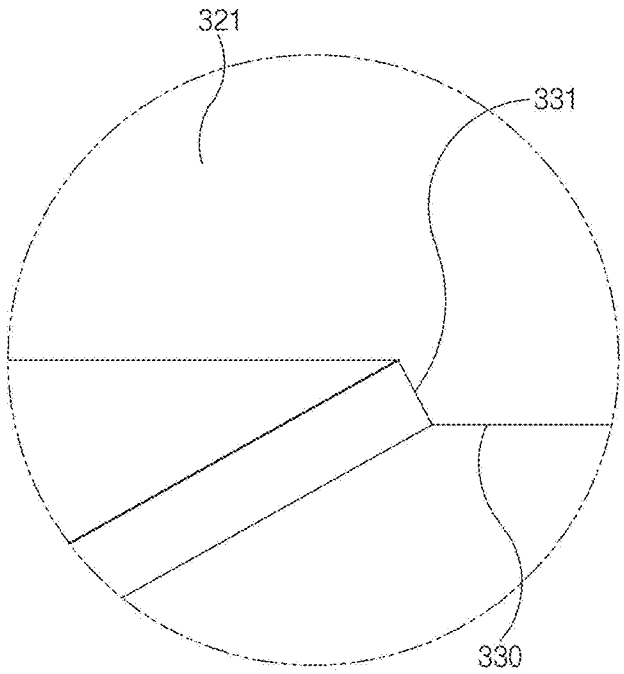
FIG. 6 is an enlarged perspective view of a step part of FIG. 5.
Figure 7:
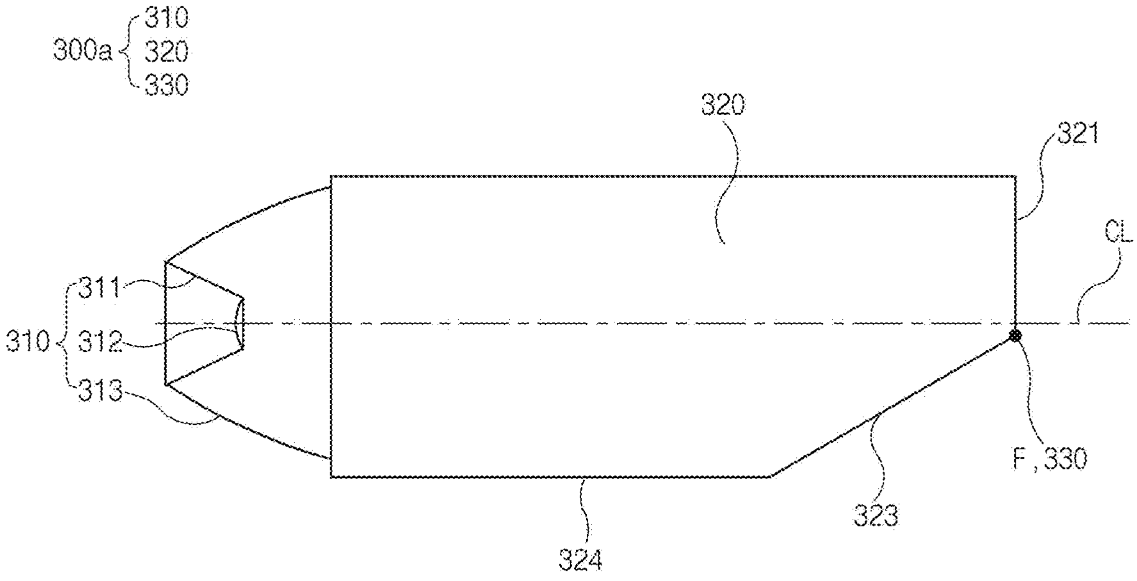
FIG. 7 is a side view illustrating a side surface of a first lens structure according to an embodiment of the present disclosure.
Figure 8:
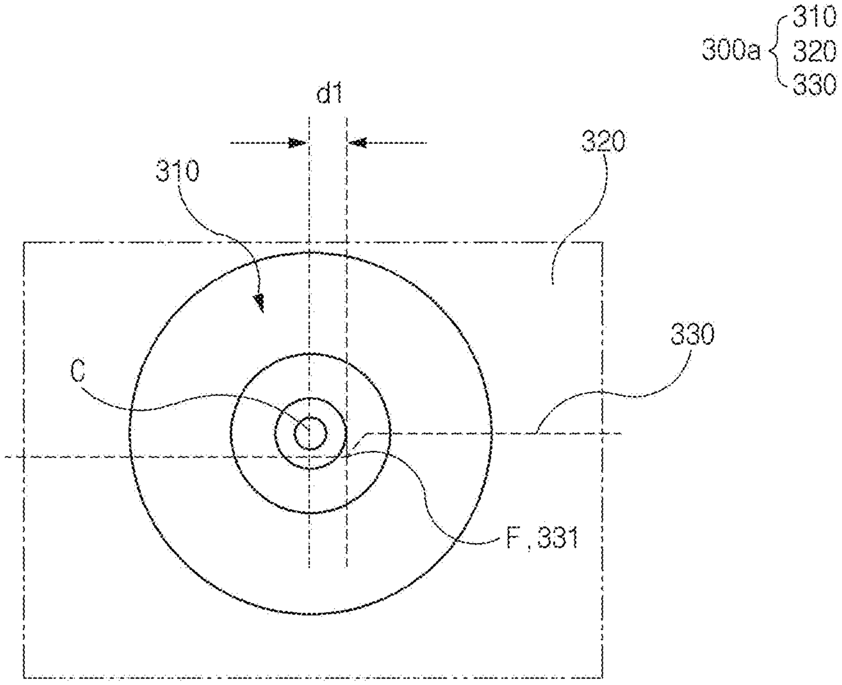
FIG. 8 is a front view of a first lens structure illustrated in FIG. 7 as viewed from a first light input part.

FIG. 1 is a top view illustrating a lamp for a vehicle according to an embodiment of the present disclosure, FIG. 2 is a side view illustrating a lamp for a vehicle according to an embodiment of the present disclosure, FIG. 3 is a top view illustrating a first total reflection lens and a first output lens part according to an embodiment of the present disclosure, FIG. 4 is a side view illustrating a first total reflection lens and a first output lens part according to an embodiment of the present disclosure, FIG. 5 is a perspective view illustrating a first total reflection lens and a first output lens part according to an embodiment of the present disclosure, FIG. 6 is an enlarged perspective view of a step part of FIG. 5, FIG. 7 is a side view illustrating a side surface of a first lens structure according to an embodiment of the present disclosure, and FIG. 8 is a front view of a first lens structure illustrated in FIG. 7 as viewed from a first light input part.

Figure 9:
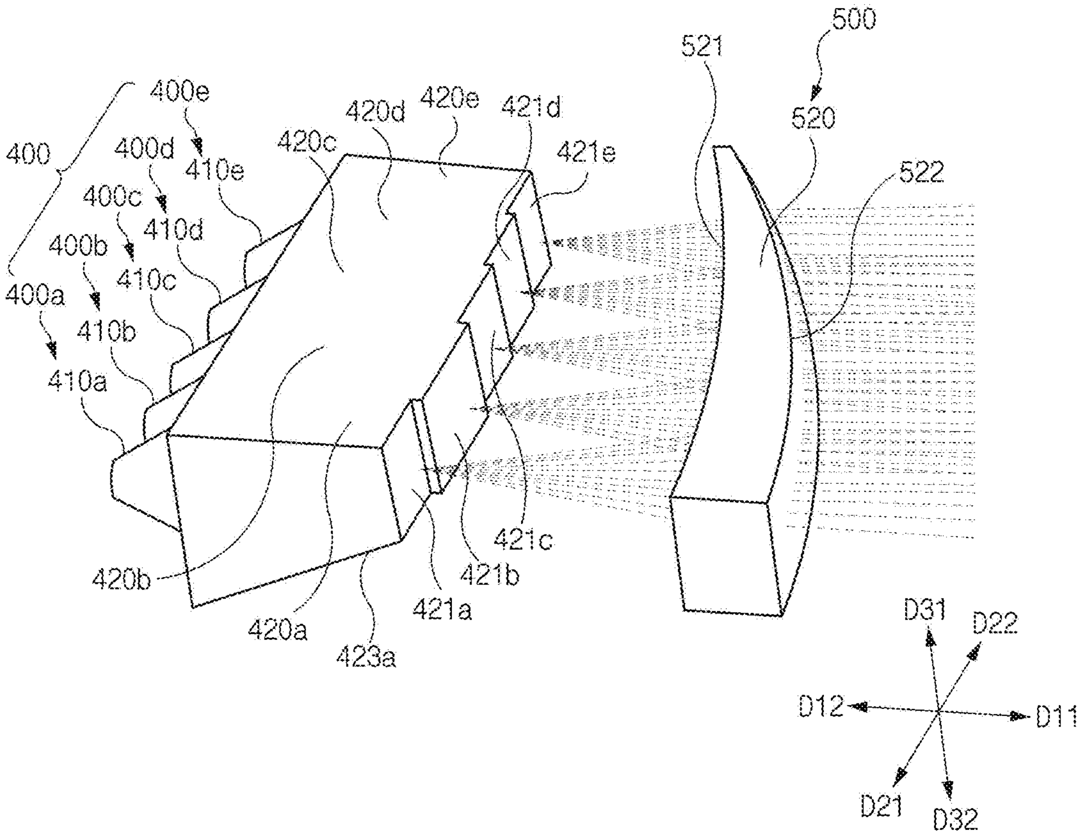
FIG. 9 is a perspective view illustrating a second total reflection lens and a second output lens part according to an embodiment of the present disclosure.
Figure 10:
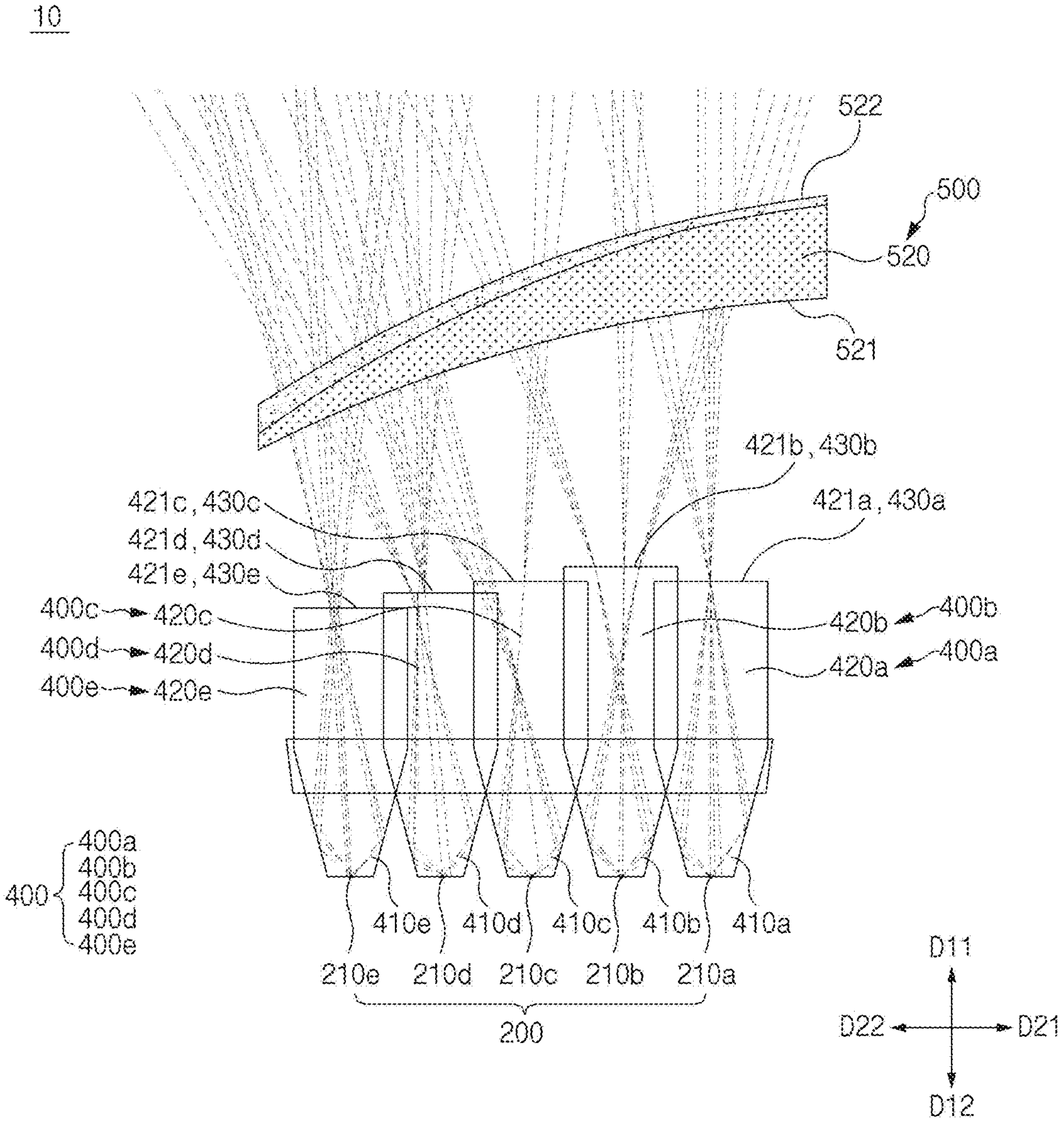
FIG. 10 is a top view illustrating a second total reflection lens and a second output lens part according to an embodiment of the present disclosure.
Figure 11:
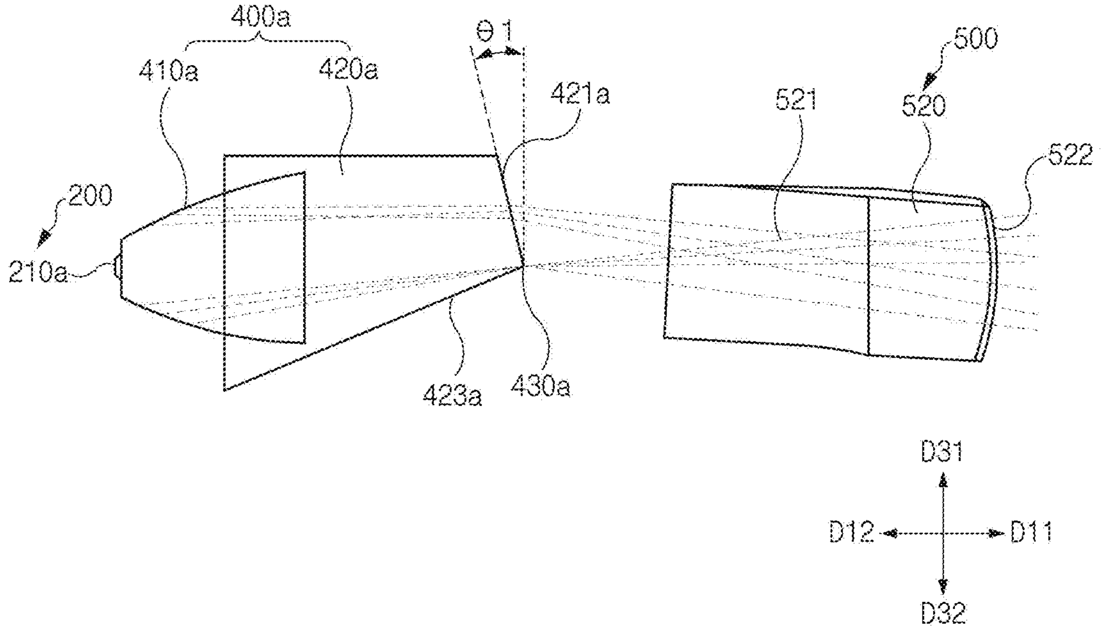
FIG. 11 is a side view illustrating a second lens structure and a second output lens part that is located at an end that is closest to one side according to an embodiment of the present disclosure.
Figure 12:
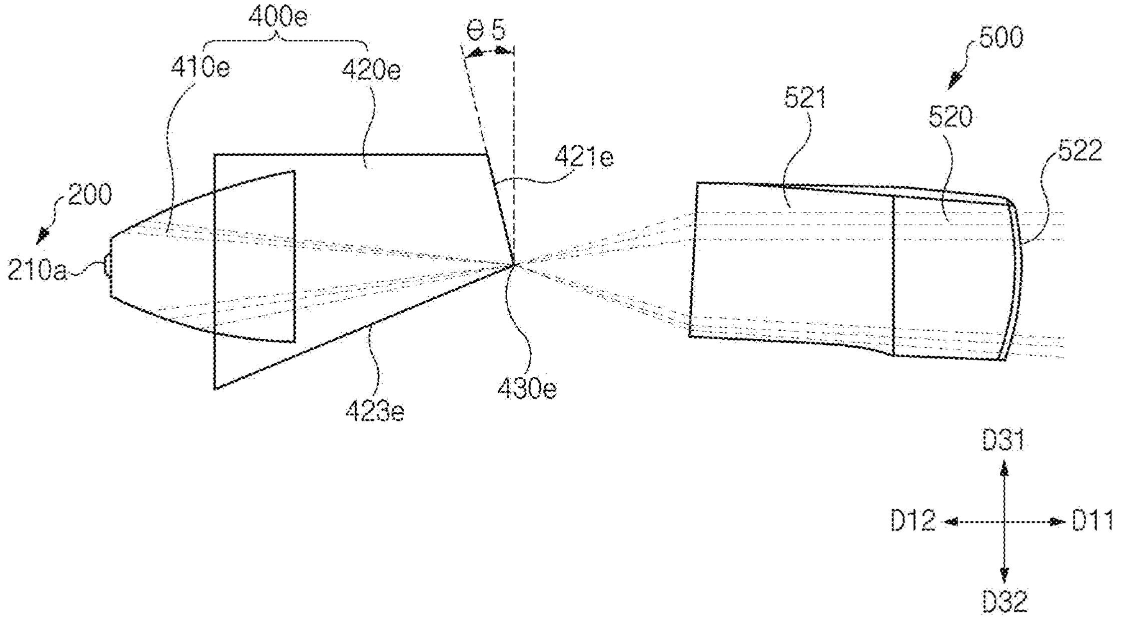
FIG. 12 is a side view illustrating a second lens structure and a second output lens part positioned at an end that is closest to an opposite end according to an embodiment of the present disclosure.
Figure 13:
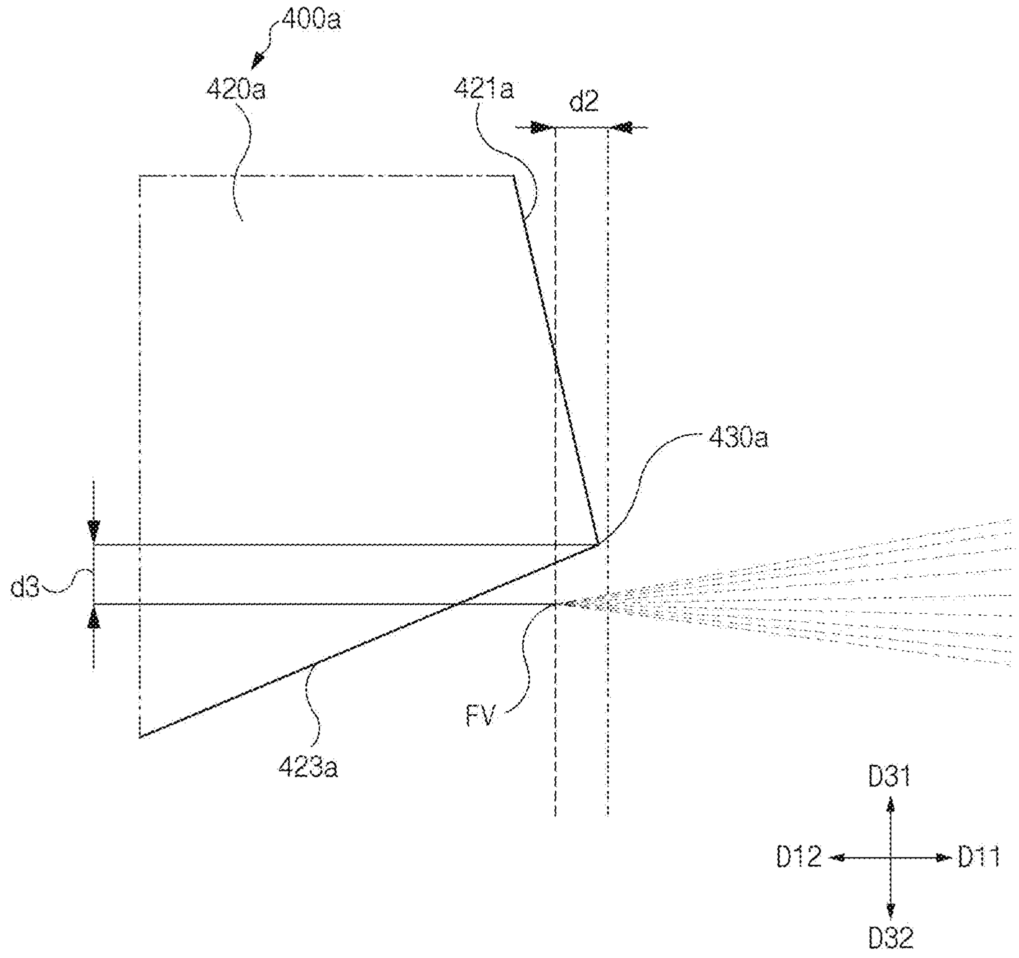
FIG. 13 is an enlarged side view of a part of FIG. 11, and is a view illustrating a positional relationship between a second output lens part and a second cutoff part.
Figure 14:
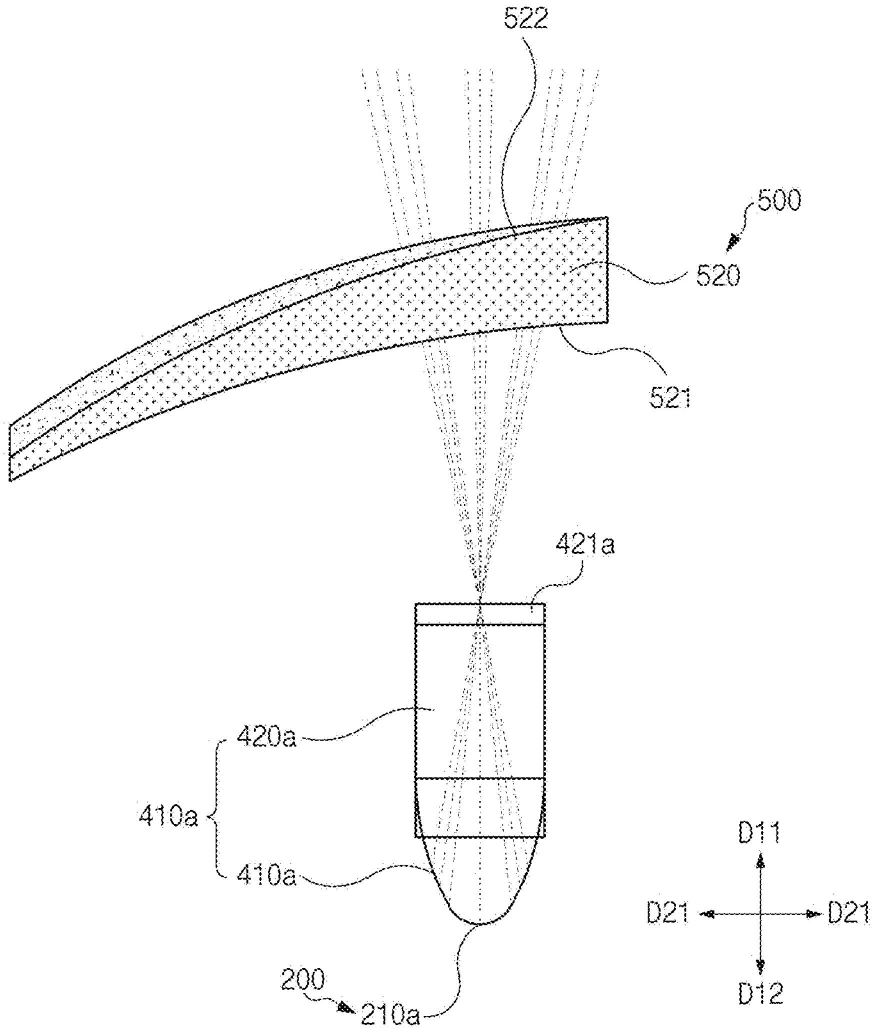
FIG. 14 is a top view illustrating a second lens structure and a second output lens part that is located at an end that is closest to one side according to an embodiment of the present disclosure.
Figure 15:
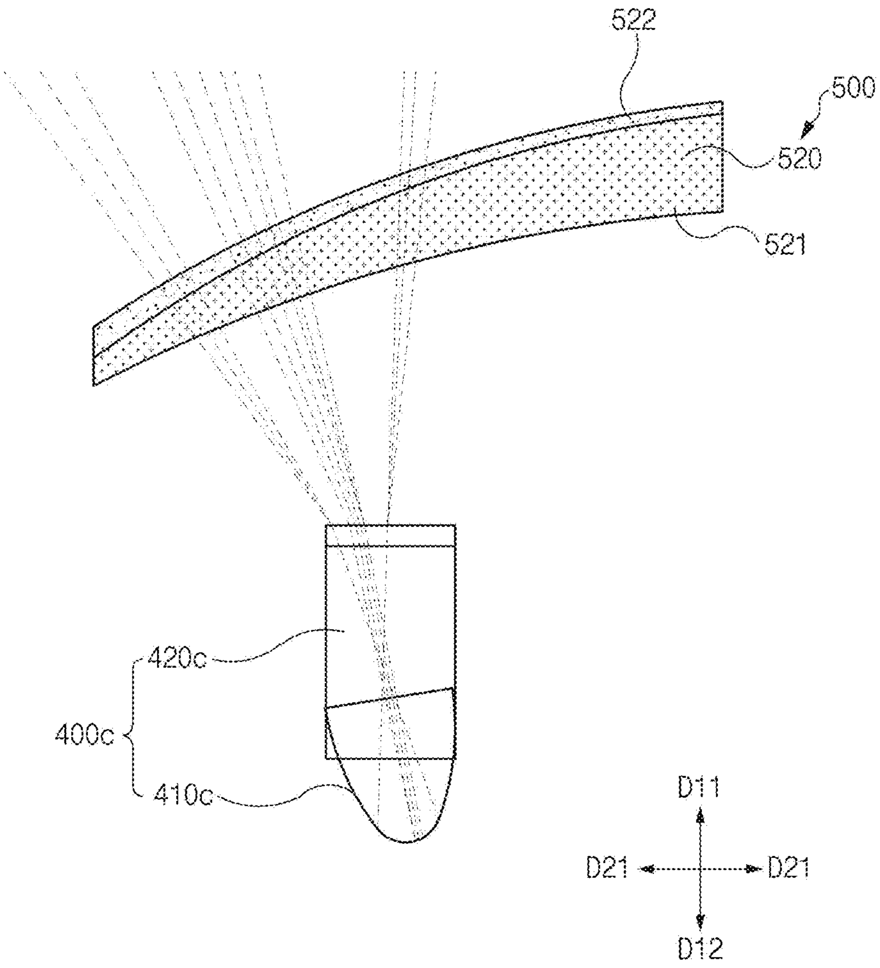
FIG. 15 is a side view illustrating a second lens structure and a second output lens part that is located third from an end on one side according to an embodiment of the present disclosure.
Figure 16:
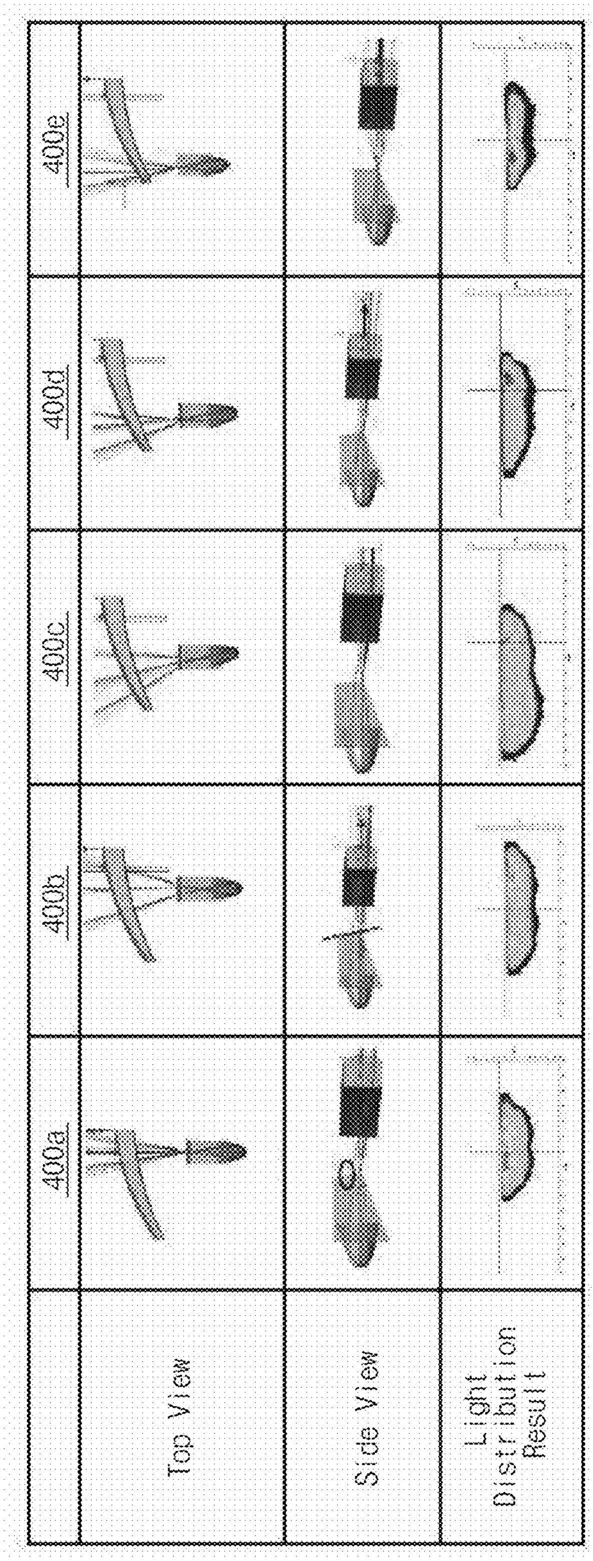
FIG. 16 is a view illustrating a second output lens part and a plurality of second lens structures, and a light distribution result according to an embodiment of the present disclosure.

FIG. 9 is a perspective view illustrating a second total reflection lens and a second output lens part according to an embodiment of the present disclosure, FIG. 10 is a top view illustrating a second total reflection lens and a second output lens part according to an embodiment of the present disclosure, FIG. 11 is a side view illustrating a second lens structure and a second output lens part that is located at an end that is closest to one side according to an embodiment of the present disclosure, FIG. 12 is a side view illustrating a second lens structure and a second output lens part positioned at an end that is closest to an opposite end according to an embodiment of the present disclosure, FIG. 13 is an enlarged side view of a part of FIG. 11, and is a view illustrating a positional relationship between a second output lens part and a second cutoff part, FIG. 14 is a top view illustrating a second lens structure and a second output lens part that is located at an end that is closest to one side according to an embodiment of the present disclosure, FIG. 15 is a side view illustrating a second lens structure and a second output lens part that is located third from an end on one side according to an embodiment of the present disclosure, and FIG. 16 is a view illustrating a second output lens part and a plurality of second lens structures, and a light distribution result according to an embodiment of the present disclosure.

Figure 17:
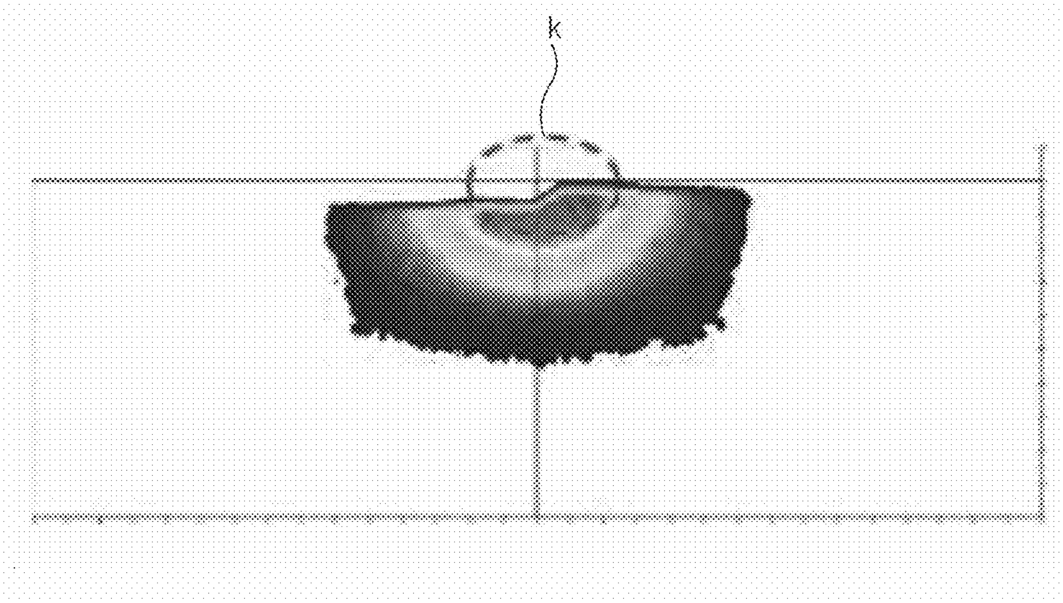
FIG. 17 is an image illustrating a stepped part of a first light distribution pattern by a lamp for a vehicle according to an embodiment of the present disclosure.
Figure 18:
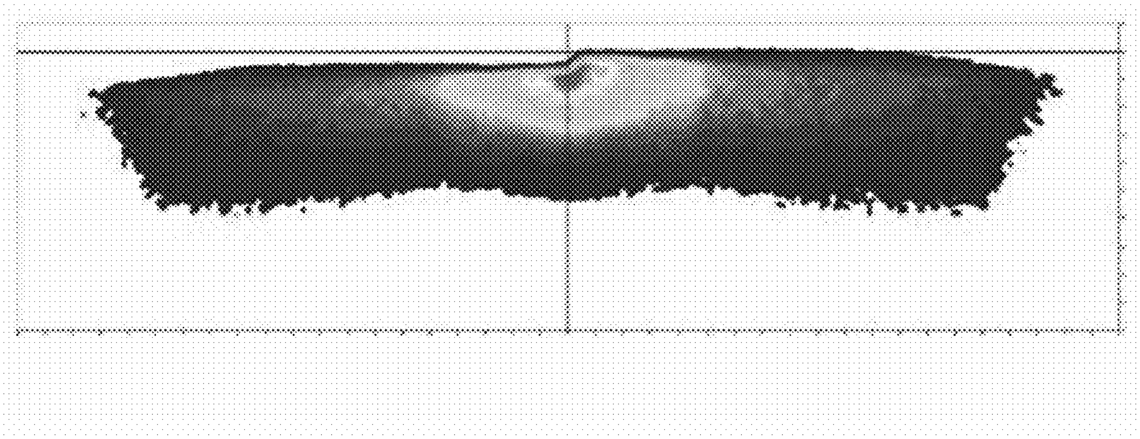
FIG. 18 is an image illustrating a first light distribution pattern by the lamp for a vehicle according to the embodiment of the present disclosure.
Figure 19:
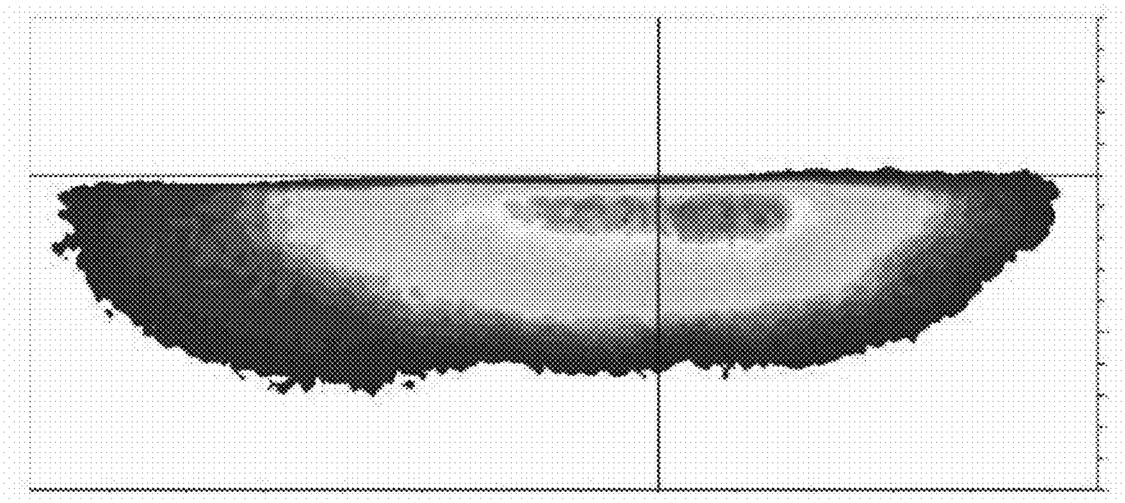
FIG. 19 is an image illustrating a second light distribution pattern of a lamp for a vehicle according to the embodiment of the present disclosure.
Figure 20:
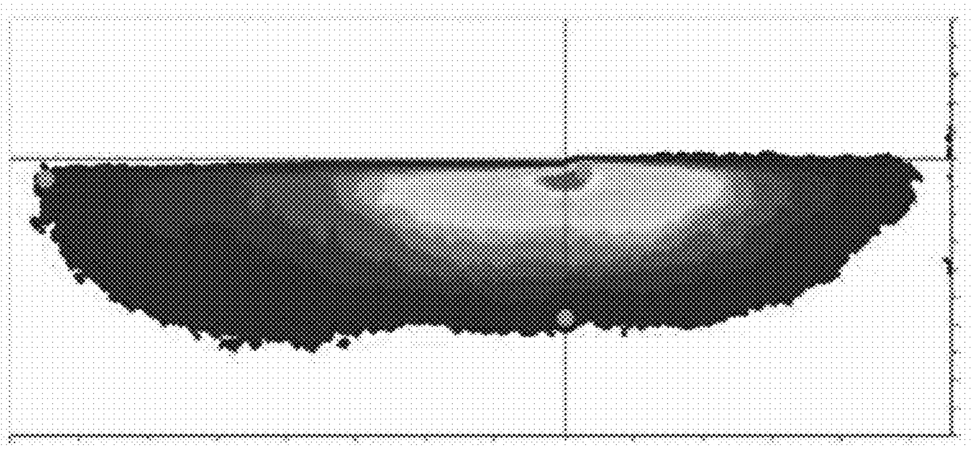
FIG. 20 is an image illustrating a low beam pattern, in which a first light distribution pattern and a second light distribution pattern overlap each other, by a lamp for a vehicle according to an embodiment of the present disclosure.
Figure 21:
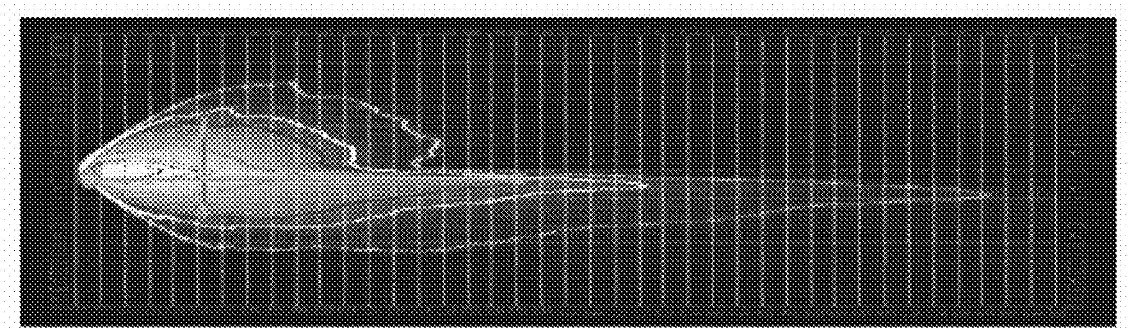
FIG. 21 is an image illustrating a light distribution pattern that is formed on a road surface by a lamp for a vehicle according to an embodiment of the present disclosure.

FIG. 17 is an image illustrating a stepped part of a first light distribution pattern by a lamp for a vehicle according to an embodiment of the present disclosure, FIG. 18 is an image illustrating a first light distribution pattern by the lamp for a vehicle according to the embodiment of the present disclosure, FIG. 19 is an image illustrating a second light distribution pattern of a lamp for a vehicle according to the embodiment of the present disclosure, FIG. 20 is an image illustrating a low beam pattern, in which a first light distribution pattern and a second light distribution pattern overlap each other, by a lamp for a vehicle according to an embodiment of the present disclosure, and FIG. 21 is an image illustrating a light distribution pattern that is formed on a road surface by a lamp for a vehicle according to an embodiment of the present disclosure.

Referring to FIGS. 1 to 16, a lamp 10 for a vehicle according to the embodiment of the present disclosure includes a first light source unit 100, a second light source unit 200, a first total reflection lens 300, a second total reflection lens 400, and an output lens 500. For reference, in FIGS. 1 to 16, D11 represents a forward direction and D12 represents a rearward direction. D21 represents an in-board direction of the vehicle toward one end, and D22 represents an out-board direction of the vehicle toward an opposite end. D31 represents an upward direction, and D32 represents a downward direction.

The first light source unit 100 includes a plurality of first light source parts 110, and is disposed on one side in a leftward/rightward direction. Furthermore, the second light source unit 200 includes a plurality of second light source parts **210*a*, 210*b*, 210*c*, 210*d*, and 210*e*, and is disposed on an opposite side to the first light source unit 100**.

A plurality of first light source parts 110 may be arranged in the leftward/rightward direction. Furthermore, the plurality of second light source parts **210*a*, 210*b*, 210*c*, 210*d*, and 210*e* may be arranged in the leftward/rightward direction. The first light source parts 110 and the second light source parts 210*a*, 210*b*, 210*c*, 210*d*, and 210*e* may be elements or devices that may emit light. For example, the first light source parts 110 and the second light source parts 210*a*, 210*b*, 210*c*, 210*d*, and 210*e* may be provided as light emitting diodes (hereinafter, referred to as LEDs). Furthermore, the first light source parts 110 and the second light source parts 210*a*, 210*b*, 210*c*, 210*d*, and 210*e*** may be mounted on a board part (not illustrated), such as a printed circuit board.

In the first total reflection lens 300, a plurality of first lens structures **300*a* that condense light irradiated from the plurality of first light source parts 110** and output the light forward are formed, and are disposed on one side with respect to the leftward/rightward direction.

Furthermore, each of the first lens structures **300*a* may include a first cutoff part 330 having a step at a lower end of a first light output surface 321*a*** that is formed (or disposed) on a front side.

Furthermore, the plurality of first lens structures **300*a* may be integrally formed to form one first total reflection lens 300**.

In the second total reflection lens 400, a plurality of second lens structures **400*a*, 400*b*, 400*c*, 400*d*, and 400*e* that condense light irradiated from the plurality of second light source parts 210*a*, 210*b*, 210*c*, 210*d*, and 210*e* and output the light forward are formed, and are disposed on an opposite side to the first light source unit 100** with respect to the leftward/rightward direction.

Furthermore, each of the second lens structures **400*a*, 400*b*, 400*c*, 400*d*, and 400*e* may include a second cutoff part 430*a*, 430*b*, 430*c*, 430*d*, and 430*e* formed at a lower end of a second light output surface 421*a*, 421*b*, 421*c*, 421*d*, and 421*e*** that is formed on a front side.

Here, the first cutoff parts 330 and the second cutoff parts **430*a*, 430*b*, 430*c*, 430*d*, and 430*e*** are provided to collectively form a cutoff line of a low beam pattern.

Specifically, the first lens structure **300*a* may serve to condense light irradiated from the first light source part 110 and guide the light to a front side, and may also serve to form a cutoff line of the low beam pattern by the first cutoff part 330. Specifically, the first lens structure 300*a*** may be formed to condense light through total internal reflection, but may form a cutoff line by deforming a partial shape of the body. Accordingly, the cutoff line may be formed while not having a separate shield member.

Furthermore, the plurality of first lens structures **300*a* may be integrally formed while being disposed in the leftward/rightward direction to form one first total reflection lens 300**. Accordingly, it is possible to improve an optical efficiency by simplifying an assembly process and minimizing an assembly tolerance through simplification of components.

Furthermore, the second lens structures 400*a*, 400*b*, 400*c*, 400*d*, and 400*e* may serve to condense light irradiated from the second light source parts 210*a*, 210*b*, 210*c*, 210*d*, and 210*e* to guide the light forward, and may also serve to form a cutoff line of the low beam pattern by the second cutoff parts 430*a*, 430*b*, 430*c*, 430*d*, and 430*e*. Specifically, the second lens structures 400*a*, 400*b*, 400*c*, 400*d*, and 400*e* may be formed to condense light through total internal reflection, but may form a cutoff line by deforming a partial shape of the body. Accordingly, the cutoff line may be formed while not having a separate shield member.

Furthermore, the plurality of second lens structures 400*a*, 400*b*, 400*c*, 400*d*, and 400*e* may be disposed in the leftward/rightward direction, and may be integrally formed to form one second total reflection lens 400. Accordingly, it is possible to improve an optical efficiency by simplifying an assembly process and minimizing an assembly tolerance through simplification of components.

Meanwhile, the output lens 500 is disposed on a front side of the first total reflection lens 300 and the second total reflection lens 400.

Specifically, the output lens 500 may include a first output lens part 510 and a second output lens part 520.

The first output lens part 510 may include a first input surface 511, to which the light output from the first total reflection lens 300 is input, and a first output surface 512, from which the input light is output.

Specifically, the first input surface 511 may be formed as a spherical surface that is formed to be convex in a direction toward the first total reflection lens 300. Furthermore, the first output surface 512 may be formed as a spherical surface that is formed to be convex toward a front side. For example, the first input surface 511 and the first output surface 512 may be symmetrical in the leftward/rightward direction with respect to an optical axis of the first output lens part 510.

The second output lens part 520 may include a second input surface 521, to which light output from the second total reflection lens 400 is input, and a second output surface 522, from which the input light is output. Furthermore, the first input surface 511 and the second input surface 521 may be formed in different shapes.

Specifically, the second input surface 521 may be formed to be curved to become closer to the second total reflection lens 400 from one end to an opposite end with respect to the leftward/rightward direction. Accordingly, the second input surface 521 and the second output lens part 520 may be formed to be asymmetrical with respect to the leftward/rightward direction with respect to an optical axis of the second output lens part 520.

Here, the second output lens part 520 may be formed to extend in the leftward/rightward direction to cover all the plurality of second lens structures 400*a*, 400*b*, 400*c*, 400*d*, and 400*e*. In this way, the first input surface 511 and the second input surface 521 may be formed in different shapes.

Furthermore, the first output surface 512 may be formed in a shape that is convex forward. Furthermore, the first output surface 512 may be symmetrical with respect to an optical axis of the first output lens part 510.

Furthermore, the second output surface 522 may be formed to be curved to become closer to the second total reflection lens 400 from one end to an opposite end with respect to the leftward/rightward direction. Accordingly, the second output surface 522 may be formed to be asymmetrical with respect to the leftward/rightward direction with respect to an optical axis of the second output lens part 520.

Here, the first output surface 512 and the second output surface 522 are formed in different shapes, but may be continuously formed without no step in the left and right direction. Because the first output surface 512 and the second output surface 522 that are disposed on a front side and form an exterior of the lamp 10 for a vehicle are continuously formed, the lamp 10 for a vehicle according to the present disclosure may provide a design-friendly effect by minimizing a sense of disconnection between light distribution patterns having different characteristics.

Meanwhile, a first light distribution pattern may be formed by the light output from the first output lens part 510 (see FIG. 18). Furthermore, a second light distribution pattern having different characteristics from those of the first light distribution pattern may be formed by the light output from the second output lens part 520 (see FIG. 19). Furthermore, the first light distribution pattern and the second light distribution pattern may overlap with each other to form a low beam pattern (see FIG. 20).

In the specification, the difference in characteristics of the light distribution pattern means that the light distribution characteristics of the first light distribution pattern and the second light distribution pattern and the projected pattern images are different. This may be implemented by the difference in characteristics and shapes of the first and second total reflection lenses and the first and second output lens parts.

For example, the first light distribution pattern may be a long-distance light distribution pattern (hot zone) to secure a field of view of a central area on a front side. Furthermore, the second light distribution pattern may be a light distribution pattern (wide zone) to secure a field of view of the surrounding area on a front side and to secure visibility during turning.

Meanwhile, a number of the second lens structures 400*a*, 400*b*, 400*c*, 400*d*, and 400*e* may be greater than that of the first lens structures 300*a*. As in an embodiment illustrated as an example, the number of the first lens structures 300*a* may be three, and the number of the second lens structures 400*a*, 400*b*, 400*c*, 400*d*, and 400*e* may be five, but the numbers of first and second lens structures are not limited thereto.

Specifically, the first light distribution pattern formed by the first lens structure 300*a* may be designed to have a light intensity that is higher than or equal to a specific light intensity (e.g., a maximum of 30,000 cd or higher) to satisfy a light distribution performance. To this end, a plurality of light distribution patterns may be provided.

Furthermore, the second light distribution pattern formed by the plurality of second lens structures 400*a*, 400*b*, 400*c*, 400*d*, and 400*e* may be designed to spread by a specific angle or more (e.g., about 40 degrees or more) in the leftward/rightward direction to satisfy the light distribution performance. To implement the spreading characteristics, the plurality of second lens structures 400*a*, 400*b*, 400*c*, 400*d*, and 400*e* may be arranged in the leftward/rightward direction. Accordingly, it is possible to secure a turning visibility.

Furthermore, because the light distribution patterns by the second lens structures 400*a*, 400*b*, 400*c*, 400*d*, and 400*e* have the characteristics of spreading leftward and rightward, a larger number of first lens structures 300*a* may be provided for a spreading design.

Meanwhile, hereinafter, the first total reflection lens 300 will be described in detail with reference to FIGS. 3 to 8.

Each of the plurality of first lens structures 300*a* may include a first light input part 310, of which light is input, and a first body part 320 that is disposed on a front side of the first light input part 310, and in which a first light output surface 321*a* is formed on a front side.

Furthermore, the first body part 320 may include a first inclined surface 323 that is formed on a lower surface thereof to be inclined upward as it goes to a front side. Furthermore, the first cutoff part 330 may be formed at a front end of the first inclined surface 323.

Specifically, the first lens structure 300*a* may be a total internal reflection (TIR) lens that guides and condenses input light by total internal reflection. The first light input part 310 may include a central light input surface 311 and a side light input surface 312, to which light is input, and a total reflection surface 313, from which the input light is totally reflected. In the illustrated embodiment, "H" denotes a depth of a central light input surface 311, "D" denotes a size (diameter) of the central light input surface 311, and "A" denotes an inclination angle of a side input surface. The optical characteristics of the first lens structure 300*a* may be determined by a shape of the first light input part 310 that is determined by a focal length L2 of the first lens structure 300*a*, a focal length L1 of the second output lens part 520, and sizes of "A", "D", and "H".

The first body part 320 forms a body of the first lens structure 300*a*, and the light input to the first light input part 310 may be totally reflected in the first body part 320. A side surface of the first body part 320 on a front side may be a first light output surface 321*a*, from which light is output.

The first inclined surface 323 may be formed on a lower surface of the first body part 320. The first inclined surface 323 may be formed to be inclined upward as it goes toward the first light output surface 321*a*. The first cutoff part 330 may be formed at a point, at which the first inclined surface 323 and the first light output surface 321*a* meet each other. A cutoff line of the first light distribution pattern may be formed by the shape of the first cutoff part 330. By guidance of light by the first inclined surface 323 and the shape of the first cutoff part 330, a cutoff line of the low beam pattern may be formed with no separate shield member.

Here, for example, the first inclined surface 323 may be formed at a portion of a lower surface of the first body part 320. Accordingly, more light may be output forward than when the inclined surface is formed on the entire lower surface, and thus, a light intensity for forming the first light distribution pattern may be secured while the cutoff line is formed. A reference numeral 324 that is not described is an area of the lower surface of the first body part 320, in which the first inclined surface 323 is not formed.

Meanwhile, referring to FIGS. 5 and 6, the first light distribution pattern formed (or located) in the first total reflection lens 300 includes a stepped part of the cutoff line (see part "k" of FIG. 17). The first cutoff part 330 may be formed to have a step 331 at a center thereof to form the stepped part "k".

In the first output lens part 510, because the first output surface 512 and the first input surface 511 are formed to be symmetrical to each other with respect to the optical axis, light may be concentrated at the optical axis and an area that is adjacent to the optical axis.

Meanwhile, referring to FIG. 3, the plurality of first light output surfaces 321*a* provided in the plurality of first lens structures 300*a* may be integrally formed to form one lens light output surface 321.

Furthermore, the lens light output surface 321 may be formed as a curved surface, and a leftward/rightward cross-sectional shape of the lens light output surface 321 may be formed in a curved shape that is concave in a direction toward the first light source unit 100.

Specifically, the first total reflection lens 300 includes a plurality of first lens structures 300*a*, and each of the plurality of first lens structures 300*a* includes a first light output surface 321*a*. In an embodiment of the present disclosure, because light is concentrated in one area of the first total reflection lens 300, the plurality of first light output surfaces 321*a* may be continuously formed with no stepped part. Then, a light output surface that is continuously formed by integrally forming the plurality of first light output surfaces 321*a* is defined as a lens light output surface 321.

Furthermore, the lens light output surface 321 may be formed as a spherical surface that is formed to be concave in a direction toward the first light input part 310 on a cross section that is parallel to a ground surface. In this way, by forming the lens light output surface 321 concavely, it is possible to condense a larger amount of light from the lens light output surface 321 toward the optical axis than when the lens light output surface 321 is flat. Accordingly, a light efficiency may be increased by improving the light intensity of the first light distribution pattern.

Meanwhile, when among the plurality of first lens structures 300*a* included in the first total reflection lens 300, the first lens structure 300*a* that is disposed in the center with respect to the leftward/rightward direction is defined as a central lens structure, and the first lens structure 300*a* that is disposed on opposite sides of the central lens structure is defined as a side lens structure, a path of the light formed in the side lens structures may be defocused on the lens light output surface 321.

Specifically, the number of first lens structures 300*a* may vary depending on a design specification of the lamp. Light that is guided by a central lens structure disposed at the center, among the plurality of first lens structures 300*a*, may be concentrated on one focus.

On the other hand, light guided by the side lens structures disposed at the sides may be defocused on the lens light output surface 321. Accordingly, most of the light that is output from the first lens structure 300*a* may be input to the first input surface 511 of the first output lens part 510.

For example, when light is condensed at a single focus in a side lens structure, as in the central lens structure, the spreading angle of light guided by the side lens structure increases, and thus, the light may not be input to the first input surface 511. Accordingly, the light guided by the side lens structure is not concentrated on the focus, and a focus is not formed on the lens light output surface (defocused), and thus, the light guided by the side lens structure may travel at a light angle, at which light may be input to the first input surface 511.

Accordingly, both the turning visibility and the light efficiency of the first light distribution pattern may be secured.

Meanwhile, referring to FIGS. 7 and 8, the first total reflection lens 300 may be formed such that a central axis CL of the first total reflection lens 300 is spaced apart from a focus "F" that is formed in the first output lens part 510 (see d1 of FIG. 8).

Here, the central axis CL of the first total reflection lens 300 means a forward/rearward axis that passes through a center "C" of the central light input surface 311 of the first light input part 310 included in the central lens structure. Furthermore, a step 331 of the first cutoff part 330 is formed on the focus "F" formed by the first output lens part 510.

The first total reflection lens 300 may be formed such that the central axis CL of the first total reflection lens 300 is spaced apart from the focus "F" formed by the first output lens part 510. Accordingly, the central axis CL of the first total reflection lens 300 may avoid the step 331 of the first cutoff part 330. Accordingly, a long-distance performance of the first light distribution pattern may be improved.

More specifically, when the central axis of the first total reflection lens 300 passes through the focus of the first output lens part 510, the light efficiency increases, but it may be difficult to achieve the long-distance performance, that is, it may be difficult for light to reach a long distance. Accordingly, because the central axis of the first total reflection lens 300 is formed to be spaced apart from the focus formed by the first output lens part 510, both the light efficiency and the long-distance performance may be secured (see FIG. 21).

Meanwhile, on a cross section that is perpendicular to the central axis of the first lens structure 300*a*, the first light output surface 321*a* may be formed to be inclined toward the first light input part 310 as it goes upward. For reference, in the illustrated embodiment, a shape, in which the lens light output surface 321 formed by the first light output surface 321*a* is inclined, is illustrated.

In this way, the light efficiency may be improved by adjusting a degree of inclination of the first light output surface 321*a*. Specifically, when the angle of the first light output surface 321*a* is formed to be perpendicular to the central axis of the first lens structure 300*a*, light may not be input to the first input surface 511. This phenomenon may occur more frequently when the output lens 500 is a left/right slim lens that is long in the leftward/rightward direction while having a low height in an upward/downward direction.

Accordingly, when the first light output surface 321*a* is formed to be inclined in consideration of the size of the first output lens part 510, most of the light output from the first lens structure 300*a* may be input to the first input surface 511. Accordingly, the light efficiency may be improved.

Meanwhile, hereinafter, the second total reflection lens 400 will be described in detail with reference to FIGS. 9 to 16.

Referring to FIGS. 9 and 10, each of a plurality of second lens structures 400*a*, 400*b*, 400*c*, 400*d*, and 400*e* may include a second light input part 410*a*, 410*b*, 410*c*, 410*d*, and 410*e*, to which light is input, and, a second body part 420*a*, 420*b*, 420*c*, 420*d*, and 420*e* that is disposed on a front side of the second light input part 410*a*, 410*b*, 410*c*, 410*d*, and 410*e*, and in which the second light output surface 421*a*, 421*b*, 421*c*, 421*d*, and 421*e* is formed on a front side thereof.

Furthermore, the second body part 420*a*, 420*b*, 420*c*, 420*d*, and 420*e* may include a second inclined surface 423*a*, 423*b*, 423*c*, 423*d*, and 423*e* that is inclined upward as it goes forward, on a lower surface thereof, and the second cutoff part 430*a*, 430*b*, 430*c*, 430*d*, and 430*e* may be formed at a front end of the second inclined surface 423*a*, 423*b*, 423*c*, 423*d*, and 423*e*.

Specifically, the second lens structure 400*a*, 400*b*, 400*c*, 400*d*, and 400*e* may be a total internal reflection (TIR) lens that guides and condenses input light by total internal reflection. The shape of the second light input parts 410*a*, 410*b*, 410*c*, 410*d*, and 410*e* may be similar to the shape of the first light input part 310, but the depth of the central light input surface, the size (diameter) of the central light input surface, and the inclination angle of the side input surface may be different.

The second body part 420*a*, 420*b*, 420*c*, 420*d*, and 420*e* form a body of the second lens structure 400*a*, 400*b*, 400*c*, 400*d*, and 400*e*, and light input to the second light input parts 410*a*, 410*d*, and 410*e* may be totally reflected in the second body part 420*a*, 420*b*, 420*c*, 420*d*, and 420*e*. A front side surface of the second body part 420*a*, 420*b*, 420*c*, 420*d*, and 420*e* may be a second light output surface 421*a*, 421*b*, 421*c*, 421*d*, and 421*e*, from which light is output.

The second inclined surface 423*a*, 423*b*, 423*c*, 423*d*, and 423*e* may be formed on the lower surface of the second body part 420*a*, 420*b*, 420*c*, 420*d*, and 420*e*. The second inclined surface 423*a*, 423*b*, 423*c*, 423*d*, and 423*e* may be formed to be inclined upward as it goes toward the second light output surface 421*a*, 421*b*, 421*c*, 421*d*, and 421*e*. The second cutoff part 430*a*, 423*b*, 423*c*, 423*d*, and 423*e* may be formed at a point, at which the second inclined surface 423*a*, 423*b*, 423*c*, 423*d*, and 423*e* and the second light output surface 421*a*, 421*b*, 421*c*, 421*d*, and 421*e* meet each other. A cutoff line of the second light distribution pattern may be formed by the shapes of the second cutoff parts 430*a*, 430*b*, 430*c*, 430*d*, and 430*e*. By guidance of the light by the second inclined surfaces 423*a*, 423*b*, 423*c*, 423*d*, and 423*e* and the shapes of the second cutoff parts 430*a*, 430*b*, 430*c*, 430*d*, and 430*e*, a cutoff line of a low beam pattern may be formed with no separate shield member.

Here, due to the nature of the second light distribution pattern formed by the second total reflection lens 400, a stepped part is not necessary, a step may not be formed in the second cutoff parts 430*a*, 430*b*, 430*c*, 430*d*, and 430*e*.

The second light output surfaces 421*a*, 421*b*, 421*c*, 421*d*, and 421*e* may be formed to be inclined toward the second light input parts 410*a*, 410*b*, 410*c*, 410*d*, and 410*e* as they go upward.

Accordingly, a light efficiency may be improved by increasing an amount of light that is input to the second output lens part 520.

When the plurality of second lens structures 400*a*, 400*b*, 400*c*, 400*d*, and 400*e* are arranged in the leftward/rightward direction, and the inclination angles of the second light output surface 421*a*, 421*b*, 421*c*, 421*d*, and 421*e* on a cross section that passes through the central axes of the second lens structure 400*a*, 400*b*, 400*c*, 400*d*, and 400*e* and is perpendicular to the ground surface is defined as tilting angles, the tilting angles of the plurality of second light output surfaces 421*a*, 421*b*, 421*c*, 421*d*, and 421*e* provided in the plurality of second lens structures 400*a*, 400*b*, 400*c*, 400*d*, and 400*e* may be formed to become smaller as they goes from one end D21 in the leftward/rightward direction to an opposite end D22 in the leftward/rightward direction.

Specifically, when an optical path is formed in an optical system for forming a second light distribution pattern that spreads leftward and rightward, the light output from the second total reflection lens 400 may not enter the second input surface 521 and may splash upward due to an aberration of the asymmetrically formed second output lens part 520. More specifically, because the second output lens part 520 is formed to be curved toward the second total reflection lens 400 as it goes from the one end D21 to the opposite end D22, a distance between the focus and the second input surface 521 may increase as it goes toward the one end D21. Accordingly, at the one end D21, an upward light splashing phenomenon may occur more frequently than at the opposite end D22.

Accordingly, to solve this problem, the tiling angles of the plurality of second light output surfaces 421*a*, 421*b*, 421*c*, 421*d*, and 421*e* may be formed to decrease as the go from the one end D21 in the leftward/rightward direction to the opposite end D22 in the leftward/rightward direction. That is, the tiling angles of the second light output surfaces 421*a*,

421*b*, 421*c*, 421*d*, and 421*e* may be formed to be larger as they go toward the one end D21, and thus, the upward light splashing phenomenon may be minimized.

For example, in FIG. 11, a second lens structure 400*a* disposed on a side that is closest to the one side is illustrated. Furthermore, in FIG. 12, a second lens structure 400*e* disposed on a side that is closest to the opposite side is illustrated. As in the illustrated embodiment, a tilting angle θ1 of the second light output surface 421*a* of the second lens structure 400*a*, which is disposed on a side that is closest to the one side, may be formed to be greater than the tilting angle θ5 of the second light output surface 421*e* of the second lens structure 400*e*, which is disposed on a side that is closest to the opposite side. This may also be identified through the side view of FIG. 16.

Meanwhile, as illustrated in FIGS. 1 and 3, the first input surface 511 may be formed to be convex in a direction toward the first total reflection lens 300 with respect to the leftward/rightward direction. Furthermore, the first output surface 512 may be formed to be convex toward the front side with respect to the leftward/rightward direction.

On the other hand, as illustrated in FIGS. 9 and 10, a rear side of the second input surface 521 may curved in a direction toward the second total reflection lens 400 as it goes from the one end D21 to the opposite end D22 with respect to the leftward/rightward direction. Furthermore, the second output surface 522 may be curved in a shape corresponding to the second input surface 521 with respect to the leftward/rightward direction.

Furthermore, the first output surface 512 and the second output surface 522 may be continuously formed with no stepped part.

Referring to FIGS. 9 and 10, the light guided by the plurality of second lens structures 400*a*, 400*b*, 400*c*, 400*d*, and 400*e* may form a plurality of vertical focuses with respect to the vertical direction. The second light distribution pattern may be designed such that only a vertical focus is formed due to leftward and rightward spreading design characteristics.

And a plurality of vertical focuses may be formed to be curved along a curving direction of the second output surface 522.

Specifically, because the second output surface 522 and the second input surface 521 are formed to be curved, the focuses of the parts of the second output lens part 520 may be different. Accordingly, the vertical focuses of the second lens structures 400*a*, 400*b*, 400*c*, 400*d*, and 400*e* may be formed differently to correspond to the different focuses of the parts of the second output lens part 520.

Furthermore, the positions of the plurality of second cutoff parts 430*a*, 430*b*, 430*c*, 430*d*, and 430*e* provided in the plurality of second lens structures 400*a*, 400*b*, 400*c*, 400*d*, and 400*e* may be formed differently to be located at positions corresponding to the plurality of vertical focuses.

Specifically, the second cutoff parts 430*a*, 430*b*, 430*c*, 430*d*, and 430*e* may be located at positions corresponding to the plurality of focuses formed in the second output lens part 520. Accordingly, the positions of the second cutoff parts 430*a*, 430*b*, 430*c*, 430*d*, and 430*e* may be formed at a plurality of different positions to be located at positions corresponding to a plurality of vertical focuses.

Meanwhile, referring to FIG. 13, the second cutoff parts 430*a*, 430*b*, 430*c*, 430*d*, and 430*e* may be formed to be located on a front side of the position of the focus formed by the second output lens part 520.

Specifically, as described above, the aberration of the second output lens part 520 may be more severe as it is positioned to be closest to the one end with respect to the leftward/rightward direction. Furthermore, an upward light splashing phenomenon may occur due to this. By locating the second cutoff parts 430*a*, 430*b*, 430*c*, 430*d*, and 430*e* on a front side of the focuses of the second output lens parts 520, the path of the light output from the second light output surfaces 421*a*, 421*b*, 421*c*, 421*d*, and 421*e* may be adjusted such that the light is input to the second output lens part 520. Accordingly, it is possible to minimize the light splashing phenomenon, in which light cannot be input to the second output lens part 520.

Meanwhile, referring to FIGS. 14 to 16, the path of the light formed by at least some of the plurality of second lens structures 400*a*, 400*b*, 400*c*, 400*d*, and 400*e* may be leftward/rightward asymmetric with respect to the central axes of the second lens structures 400*a*, 400*b*, 400*c*, 400*d*, and 400*e*.

Specifically, referring to the optical paths illustrated in FIGS. 10 and 16, it may be identified that the optical paths by the plurality of second lens structures 400*a*, 400*b*, 400*c*, 400*d*, and 400*e* are different. This is because the shapes of the parts of the second output lens part 520 and the positions of the second light output surfaces 421*a*, 421*b*, 421*c*, 400*d*, and 421*e* of the second lens structures 400*a*, 400*b* 400*c*, 400*d*, and 400*e* are different.

For example, in FIG. 14, a second lens structure 400*a* disposed on a side that is closest to the one side is illustrated. Furthermore, in FIG. 15, a second lens structure 400*c* disposed third from the one end is illustrated. As in the illustrated embodiment, a path of the light guided by the second lens structure 400*a* disposed at a side that is closest to the one side may be leftward/rightward symmetrical with respect to the central axis of the second lens structure 400*a*. On the other hand, a path of light guided by a second lens structure 400*c* disposed third from the one end may be leftward/rightward asymmetrical with respect to the central axis of the second lens structure 400*c*.

Spreading characteristics that satisfy the light distribution performance regulation may be secured by the light path. However, the light path by the plurality of second lens structures 400*a*, 400*b*, 400*c*, 400*d*, and 400*e* and the second output lens part 520 is not limited to the illustrated embodiments.

According to the embodiment of the present disclosure, the plurality of second lens structures is disposed in the leftward/rightward direction and are integrally formed to form one second total reflection lens, and thus, the light efficiency may be improved by simplifying the assembly process and minimizing the assembly tolerance.

Although specific embodiments of the present disclosure have been described above, the spirit and scope of the present disclosure are not limited to these specific embodiments, and various modifications and variations can be made by a person skilled in the art, to which the present disclosure pertains, without deviating from the gist of the present disclosure described in the claims.

What is claimed is:

1. A lamp for a vehicle, comprising:

a first light source unit including a plurality of first light source parts and disposed on a first side of the vehicle in a leftward/rightward direction;

a second light source unit including a plurality of second light source parts and disposed on a second side of the vehicle opposite to the first side;

a first total reflection lens configured to condense light irradiated from the plurality of first light source parts and output the light forward, in which a plurality of first lens structures is integrally formed and disposed on the first side of the vehicle;

a second total reflection lens, in which a plurality of second lens structures configured to condense light irradiated from the plurality of second light source parts and output the light forward are integrally formed and disposed on the second side of the vehicle; and an output lens disposed on a front side of the first total reflection lens and the second total reflection lens, wherein each of the plurality of first lens structures includes a first cutoff part having a step at a lower end of a first light output surface disposed on a front side of each first lens structure, wherein each of the plurality of second lens structures includes a second cutoff part disposed at a lower end of a second light output surface disposed on the front side of each second lens structure, and wherein the first cutoff part and the second cutoff part are configured to collectively form a cutoff line of a low beam pattern, wherein each of the plurality of first lens structures has a lower surface facing downwardly and including a first inclined surface disposed inclined upwardly toward the front side of each first lens, and the first cutoff part is located at a front end portion of the first inclined surface, and wherein each of the plurality of second lens structures has a lower surface facing downwardly and including a second inclined surface inclined upwardly toward the front side of each second lens, and the second cutoff part is disposed at a front end portion of the second inclined surface.

2. The lamp of claim 1, wherein the output lens includes:

a first output lens part including (1) a first input surface, to which light output from the first total reflection lens is input and (2) a first output surface, from which the light input to the first input surface is output; and a second output lens part including (1) a second input surface, to which light output from the second total reflection lens is input and (2) a second output surface, from which the light input to the second input surface is output, and wherein the first input surface and the second input surface have different shapes.

3. The lamp of claim 2, wherein:

a first light distribution pattern is formed by the light output from the first output lens part, a second light distribution pattern is formed by the light output from the second output lens part and is different from the first light distribution pattern, and the first light distribution pattern and the second light distribution pattern overlap with each other to form a low beam pattern.

4. The lamp of claim 1, wherein a number of the plurality of second lens structures is greater than that of the plurality of first lens structures.

5. The lamp of claim 2, wherein:

each of the plurality of first lens structures includes:

a first light input part, to which light is input; and a first body part disposed on a front side of the first light input part, wherein the first light output surface is disposed on a front side of the first body part, and the first body part includes the first inclined surface.

6. The lamp of claim 5, wherein:

the plurality of first light output surfaces respectively provided in the plurality of first lens structures is integrally formed and defines a lens light output surface, and the lens light output surface has a shape, in which a leftward/rightward cross-sectional shape of the lens light output surface is curved to be concave in a direction toward the first light source unit.

7. The lamp of claim 6, wherein, among the plurality of first lens structures included in the first total reflection lens, the first lens structure disposed at a center with respect to the leftward/rightward direction is defined as a central lens structure, and the first lens structure disposed on opposite sides of the central lens structure are defined as a plurality of side lens structures, a plurality of paths of light located in the plurality of side lens structures, is defocused on the lens light output surface.

8. The lamp of claim 6, wherein a central axis of the first total reflection lens is spaced apart from a focus located in the first output lens part.

9. The lamp of claim 5, wherein, on a cross-section perpendicular to a central axis of the first lens structure, the first light output surface is inclined upwardly toward the first light input part.

10. The lamp of claim 2, wherein:

the second lens structure includes:

a second light input part, to which the light is input; and a second body part disposed on a front side of the second light input part, wherein the second light output surface is disposed on a front side of the second body part, the second body part includes the second inclined surface.

11. The lamp of claim 10, wherein the second light output surface is inclined upwardly toward the second light input part.

12. A lamp for a vehicle, comprising:

a first light source unit including a plurality of first light source parts and disposed on a first side of the vehicle in a leftward/rightward direction;

a second light source unit including a plurality of second light source parts and disposed on a second side of the vehicle opposite to the first side;

a first total reflection lens configured to condense light irradiated from the plurality of first light source parts and output the light forward, in which a plurality of first lens structures is integrally formed and disposed on the first side of the vehicle;

a second total reflection lens, in which a plurality of second lens structures configured to condense light irradiated from the plurality of second light source parts and output the light forward are integrally formed and disposed on the second side of the vehicle; and an output lens disposed on a front side of the first total reflection lens and the second total reflection lens, wherein each of the plurality of first lens structures includes a first cutoff part having a step at a lower end of a first light output surface disposed on a front side of each first lens structure, wherein each of the plurality of second lens structures includes a second cutoff part disposed at a lower end of a second light output surface disposed on the front side of each second lens structure, wherein the first cutoff part and the second cutoff part are configured to collectively form a cutoff line of a low beam pattern, wherein the output lens includes:

a first output lens part including (1) a first input surface, to which light output from the first total reflection lens is input and (2) a first output surface, from which the light input to the first input surface is output; and a second output lens part including (1) a second input surface, to which light output from the second total reflection lens is input and (2) a second output surface, from which the light input to the second input surface is output, wherein the first input surface and the second input surface have different shapes, wherein the second lens structure includes:

a second light input part, to which the light is input; and a second body part disposed on a front side of the second light input part, wherein the second light output surface is disposed on a front side of the second body part, wherein the second body part includes a second inclined surface inclined upwardly on a lower surface of the second body part, wherein the second cutoff part is disposed at a front end of the second inclined surface, wherein the second light output surface is inclined upwardly toward the second light input part, wherein the plurality of second lens structures is arranged in the leftward/rightward direction, and wherein when an angle, at which the second light output surface is tilted on a cross-section passing through a central axis of the second lens structure and being perpendicular to a ground surface, is defined as a tilting angle, the tilting angles of the second light output surfaces provided in the plurality of second lens structures become smaller as they go from ends with respect to the leftward/rightward direction to opposite ends with respect to the leftward/rightward direction.

13. The lamp of claim 2, wherein:

the first input surface is convex in the leftward/rightward direction, and the first output surface is convex in the leftward/rightward direction.

14. The lamp of claim 2, wherein:

the second input surface is curved inwardly in the leftward/rightward direction, and the second output surface is curved outwardly in the leftward/rightward direction.

15. The lamp of claim 14, wherein the first output surface and the second output surface are disposed continuously.

16. A lamp for a vehicle, comprising:

a first light source unit including a plurality of first light source parts and disposed on a first side of the vehicle in a leftward/rightward direction;

a second light source unit including a plurality of second light source parts and disposed on a second side of the vehicle opposite to the first side;

a first total reflection lens configured to condense light irradiated from the plurality of first light source parts and output the light forward, in which a plurality of first lens structures is integrally formed and disposed on the first side of the vehicle;

a second total reflection lens, in which a plurality of second lens structures configured to condense light irradiated from the plurality of second light source parts and output the light forward are integrally formed and disposed on the second side of the vehicle; and an output lens disposed on a front side of the first total reflection lens and the second total reflection lens, wherein each of the plurality of first lens structures includes a first cutoff part having a step at a lower end of a first light output surface disposed on a front side of each first lens structure, wherein each of the plurality of second lens structures includes a second cutoff part disposed at a lower end of a second light output surface disposed on the front side of each second lens structure, wherein the first cutoff part and the second cutoff part are configured to collectively form a cutoff line of a low beam pattern, wherein the output lens includes:

a first output lens part including (1) a first input surface, to which light output from the first total reflection lens is input and (2) a first output surface, from which the light input to the first input surface is output; and a second output lens part including (1) a second input surface, to which light output from the second total reflection lens is input and (2) a second output surface, from which the light input to the second input surface is output, wherein the first input surface and the second input surface have different shapes, wherein the second input surface has a rear side curved in a direction toward the second total reflection lens, wherein the second output surface is curved in a shape corresponding to the second input surface, wherein light guided by the plurality of second lens structures forms a plurality of vertical focuses in a vertical direction, and wherein the plurality of vertical focuses is curved along a direction in which the second output surface is curved.

17. The lamp of claim 16, wherein the plurality of second cutoff parts provided in the plurality of second lens structures is respectively located in a plurality of positions corresponding to the plurality of vertical focuses.

18. The lamp of claim 17, wherein the second cutoff part is disposed on a front side of a focus formed by the second output lens part.

19. The lamp of claim 14, wherein a path of light formed by at least some of the plurality of second lens structures is asymmetrical in the leftward/rightward direction with respect to central axes of the plurality of second lens structures.

* * * * *